United States Patent
Beck et al.

[11] Patent Number: 5,912,734
[45] Date of Patent: *Jun. 15, 1999

[54] RAMAN GAS ANALYSIS SYSTEM WITH BALL AND SOCKET ASSEMBLY FOR PRECISION OPTICAL ALIGNMENT

[75] Inventors: Kent F. Beck, West Valley City; Charles V. Owen, Highland, both of Utah

[73] Assignee: Ohmeda Inc., Louisville, Colo.

[ * ] Notice: This patent is subject to a terminal disclaimer.

[21] Appl. No.: 08/691,579

[22] Filed: Aug. 2, 1996

Related U.S. Application Data

[62] Division of application No. 08/366,840, Dec. 30, 1994, abandoned.

[51] Int. Cl.⁶ .................................................. G01J 3/44
[52] U.S. Cl. .......................................... 356/301; 372/107
[58] Field of Search .............................. 356/301; 372/107

[56] References Cited

U.S. PATENT DOCUMENTS

| | | | |
|---|---|---|---|
| Re. 31,279 | 6/1983 | Mefferd et al. | 372/107 |
| Re. 34,153 | 12/1992 | Benner et al. | 356/301 |
| 3,229,224 | 1/1966 | Waly et al. . | |
| 3,359,812 | 12/1967 | Everitt . | |
| 3,402,613 | 9/1968 | Neusel et al. . | |
| 3,464,024 | 8/1969 | Bell et al. . | |
| 3,484,715 | 12/1969 | Rempel . | |
| 3,564,452 | 2/1971 | Rempel . | |
| 3,566,302 | 2/1971 | Rhodes | 372/107 |
| 3,752,554 | 8/1973 | Thatcher . | |
| 3,783,404 | 1/1974 | Matsuoka . | |
| 3,826,998 | 7/1974 | Kindl et al. | 248/476 |
| 3,864,029 | 2/1975 | Mohler . | |
| 4,016,504 | 4/1977 | Klauminzer . | |
| 4,298,248 | 11/1981 | Lapp . | |
| 4,399,540 | 8/1983 | Bücher | 372/20 |
| 4,414,460 | 11/1983 | Sudo et al. . | |
| 4,442,524 | 4/1984 | Reeder et al. | 372/107 |

(List continued on next page.)

FOREIGN PATENT DOCUMENTS 59-204291 11/1984 Japan .
63-70469 3/1988 Japan .

OTHER PUBLICATIONS

"HeliCoil Thread Repair System", Sales Brochure, publication date unknown.

*Primary Examiner*—Frank G. Font
*Assistant Examiner*—Reginald A. Ratliff
*Attorney, Agent, or Firm*—Holme Roberts & Owen

[57] ABSTRACT

A mechanism for aligning the elements of an optical system is disclosed. One aspect of the present invention is an alignment mechanism which includes lead screws placed on opposite corners of the elements to be aligned. The elements are provided with threaded holes of different pitch, and the lead screw is provided with threads of the same unequal pitches as the elements, thereby forming a differential lead screw. The threads include a locking thread which assures a positive lock between the lead screw and the elements to be aligned and eliminates backlash between them. Another aspect of the present invention is an interference fit mechanism which is provided by the employment of a slightly-oversized flexible boss which mates with a cavity. The boss is provided with a thin outer wall capable of flexing when the boss is inserted into the cavity. Yet another aspect of the present invention includes a wobble plate comprising a spherical socket and housing. The housing includes a mounting for an optical element and is rotatable within the socket. Application of an adhesive to the space between the socket and housing secures the relative positions of the socket and housing when the alignment operations have been completed.

8 Claims, 5 Drawing Sheets

U.S. PATENT DOCUMENTS

| | | | |
|---|---|---|---|
| 4,515,447 | 5/1985 | Weimer et al. | |
| 4,638,486 | 1/1987 | Dost et al. | 372/107 |
| 4,672,626 | 6/1987 | Koseki | 372/107 |
| 4,674,097 | 6/1987 | Fountain | 372/107 X |
| 4,680,771 | 7/1987 | Koseki | 372/107 |
| 4,784,486 | 11/1988 | Van Wagenen et al. | 356/301 |
| 4,796,275 | 1/1989 | Koop | 372/107 |
| 4,878,227 | 10/1989 | Ackermann et al. | 372/107 |
| 4,891,820 | 1/1990 | Rando et al. | 372/107 X |
| 5,004,205 | 4/1991 | Brown et al. | 248/476 |
| 5,135,304 | 8/1992 | Miles et al. | 356/301 |
| 5,153,671 | 10/1992 | Miles | 356/301 |
| 5,245,405 | 9/1993 | Mitchell et al. | 356/301 |

RAMAN GAS ANALYSIS SYSTEM WITH BALL AND SOCKET ASSEMBLY FOR PRECISION OPTICAL ALIGNMENT

This application is a division of application Ser. No. 08/366,840; filed on Dec. 30, 1994, now abandoned.

FIELD OF THE INVENTION

The invention relates to devices which allow the individual elements of an optical system, particularly the optics in a laser-activated Raman light scattering gas analysis system, to be precisely positioned with respect to each other in an efficient, stable and robust fashion.

BACKGROUND OF THE INVENTION

Raman light scattering has been successfully used in critical care situations to continuously monitor a patient's respiratory gases. This technique is based on the effect which occurs when monochromatic light interacts with vibrational/rotational modes of gas molecules to produce scattered light which is frequency shifted from that of the incident radiation by an amount corresponding to the vibrational/rotational energies of the scattering gas molecules. If the incident light photon loses energy in the collision, it is reemitted as scattered light with lower energy and consequently lower frequency than the incident photon. In a similar manner, if the incident photon gains energy in the collision, it is reemitted as scattered light with higher energy and higher frequency than the incident photon. Since these energy shifts are species-specific, analysis of the various frequency components present in the Raman scattering spectrum of a sample provides chemical identification of the gases present in the scattering volume. The intensity of the various frequency components, i.e., Raman spectral lines, provides quantification of the gases present, providing suitable calibrations have been made. In this manner, Raman light scattering can be employed to determine the identity and quantity of various respiratory and anesthetic gases present in a patient's breath in operating room and intensive care situations.

Systems developed for analysis of gases in critical care situations utilizing Raman scattering typically employ gas cells which contain a sample of the patient's respiratory gas to be analyzed. One such system is described in U.S. Pat. No. 4,784,486, entitled "MULTI-CHANNEL MOLECULAR GAS ANALYSIS BY LASER-ACTIVATED RAMAN LIGHT SCATTERING", issued to Van Wagenen et al. The gas cell is located either within the resonant cavity of a laser or outside the cavity. In an intracavity system, such as that described by Van Wagenen, a laser beam is directed through a resonant cavity such that it intercepts a respiratory gas sample within a gas cell. An end mirror located at one end of the resonant cavity redirects light incident from a plasma discharge tube back through the resonant cavity, where it again passes through the gas cell and back into the plasma discharge tube. A Brewster prism may be mounted near the end mirror to select the desired wavelength and polarization state of the lasing light. The end mirror and Brewster prism are both mounted on one or more plates of an alignment assembly. Raman scattered light from the gas analysis region within the gas cell is collected by collection optics and directed through one or more interference filters or other means of wavelength discrimination. The collection optics and interference filters and possibly focusing optics in turn transmit the Raman scattered light to appropriate detectors for quantifying each specific Raman signal and thus each specific gas comprising the respiratory gas sample.

Intracavity systems possess the advantage that they achieve a much greater Raman scattering intensity than systems in which the Raman scattering occurs outside of the laser resonant cavity. This greater intensity is a result of the fact that a laser beam transiting an intracavity arrangement propagates through the gas sample a great many times, with a correspondingly higher time-integrated intensity of Raman scattered light from the gas sample. In contrast, an external arrangement of the gas cell allows the laser beam only one pass through the gas sample. While intracavity systems benefit from a much greater Raman signal strength than do systems having the gas cell located outside the resonant cavity, the resonator optics must be positioned with extreme accuracy for this advantage to be realized, since the multiple reflection of the laser beam within the cavity magnifies any misalignment of the cavity end mirror. Consequently, the cavity end mirror, the Brewster prism (if present), and the central axis of the laser plasma tube must all be aligned almost perfectly with respect to each other at all times during operation of the gas analysis system. The alignment of the end mirror and associated prism is controlled by adjustment mechanisms on the alignment assembly on which the mirror is mounted.

In the intracavity gas cell systems discussed above, windows are commonly provided on either end of the gas cell to protect surrounding optical elements and filters from contaminants which may be present in the gas sample. The windows further serve to confine the gas sample within the gas cell, thereby minimizing the volume of the sample and thus improving the detector's response time. In some systems, the gas cell windows are oriented at Brewster's angle to select and improve the transmission of a particular polarization state of light passing through the sample. In this manner, optical losses in the laser beam which passes through the cell are minimized. However, the gas sample, in combination with particulates often carried with the sample, may contaminate the cell windows and degrade the performance of the system. This contamination may result in undesirable light absorption and/or scattering with a consequent decrease in the laser power circulating through the sample cell. If untreated, this contamination will eventually cause the system to cease to function properly.

The problem of window and cavity optics contamination has been partially solved by providing an air dam around the optics of the laser system to shield the optics from contaminated sample. Systems for providing such an air dam are disclosed in U.S. Pat. No. 5,135,304, entitled "GAS ANALYSIS SYSTEM HAVING BUFFER GAS INPUTS TO PROTECT ASSOCIATED OPTICAL ELEMENTS", issued to Miles et al. and U.S. Pat. No. 5,153,671, entitled "GAS ANALYSIS SYSTEM HAVING BUFFER GAS INPUTS TO PROTECT ASSOCIATED OPTICAL ELEMENTS", issued to Miles. In intracavity systems such as those disclosed in U.S. Pat. No. 5,135,304, the sample of gas to be analyzed is injected near the center of the array of detectors. Simultaneously, a buffer gas such as nitrogen or filtered air is injected on the sides of the analyzer cavity. Both gas streams are exhausted at an intermediate point. This system advantageously provides a pure gas sample near the detectors while protecting the optics of the resonant cavity from contamination.

In spite of the advances made in protecting the resonant cavity optics from contamination, individual portions of the resonant cavity, including the end mirrors, gas cell and laser plasma tube, must still occasionally be disassembled and cleaned of contamination, repaired or replaced. At such times, the optical elements are disassembled and repaired or cleaned, then reassembled. The high degree of precision required of the optical alignment of the system, including the alignment of the end mirror, Brewster prism (if present), and plasma discharge tube, renders field repairs difficult. Thus, most repairs are presently made at the factory where the system can be placed on an optical bench or fixture for precision alignment of the components.

Many devices have been created to aid in the alignment of optical elements in general and for alignment of laser system components in particular.

However, most of these devices suffer from one or more of the following disadvantages: 1) complex and hence expensive mechanisms; 2) low accuracy; 3) unstable, i.e., do not hold adjustment well over time; or 4) must be carefully realigned each time the system configuration is altered. For example, U.S. Pat. No. 4,442,524, entitled "MULTIPLE LEVER APPARATUS FOR POSITIONING AN OPTICAL ELEMENT", issued to Reeder et al. discloses a system for finely adjusting the relative angular orientation of a mirror assembly. This system employs a complex set of levers to reduce the amount of adjustment made by a single turn of each adjusting screw. The Reeder system has very little backlash and does not use an extra-fine screw to directly move the mirror plate. This system is expensive to manufacture and appears to be unstable, i.e., would not hold an adjustment during temperature changes and may be sensitive to vibrations. U.S. Pat. No. 4,878,227, entitled "DEVICE FOR A MODULAR POWER LASER", issued to Ackermann et al. discloses a system wherein two plates are supported relative to each other with a "differential" thread adjustment screw arrangement. However, the "differential" thread of Ackermann is a combination of a right hand screw pitch in one plate and a left hand screw pitch in the other plate, connected by an adjustment screw having a right hand thread pitch on one end and a left hand thread pitch on the other end, each end having the same number of threads per inch, n. Thus, the effect of this arrangement is that a single turn of the adjustment screw changes the relative distance between the plates by 2/n inches. This is not suitable for precision adjustments, since the adjustment is too course.

Additional optical adjustment devices are disclosed in: U.S. Pat. No. 4,796,275, entitled "FLOATING MIRROR MOUNT", issued to Koop; U.S. Pat. No. 4,680,771, entitled "MIRROR ADJUSTMENT DEVICE IN LASER OSCILLATOR", issued to Koseki; U.S. Pat. No. 4,672,626, entitled "LASER Oscillator MIRROR ADJUSTMENT APPARATUS", issued to Koseki; U.S. Pat. No. 4,638,486, entitled "ADJUSTMENT DEVICE FOR A REFLECTOR MIRROR OF A LASER RESONATOR", issued to Dost et al.; U.S. Pat. No. 4,515,447, entitled "OPTICAL ADJUSTMENT DEVICE", issued to Weimer et al.; U.S. Pat. No. Re. 31,279, entitled "LASER OPTICAL RESONATOR", issued to Mefferd et al.; U.S. Pat. No. 3,864,029, entitled "LASER MIRROR MOUNT AND WINDOW PROTECTION ASSEMBLY", issued to Mohler; U.S. Pat. No. 3,564,452, entitled "LASER WITH STABLE RESONATOR", issued to Rempel; U.S. Pat. No. 3,484,715, entitled "TEMPERATURE COMPENSATING MOUNTING FOR LASER REFLECTORS", issued to Rempel; U.S. Pat. No. 3,359, 812, entitled "ANGLE ADJUSTING MECHANISM FOR OPTICAL ELEMENTS", issued to Everitt; Japan Patent No. 63-70469(A), entitled "ADJUSTING DEVICE FOR RESONATOR MIRROR", issued to Mitsubishi; Japan Patent No. 59-204291(A), entitled "LASER RESONATOR", issued to Nihon.

In general, commonly used optical alignment devices are not suitable for several aspects of a mass produced, field serviceable, robust, complex optical system, such as a Raman Gas Analysis system. Simple set screw mechanisms suffer from backlash between the threads and the securing bolt. This backlash allows the position of the element being adjusted to shift after the adjustment, necessitating the employment of biasing springs or other means to provide a constant pressure on the threads. More complex systems require precision alignment on an optical bench each time the system configuration is disturbed, either intentionally for repairs or unintentionally by environmental factors such as vibration and temperature changes. Thus, there exits a need for optical alignment devices which are robust in that they are easily aligned in the field and will maintain their alignment once fixed. The devices of the present invention satisfy these requirements.

SUMMARY OF THE INVENTION

In accordance with a first aspect of the present invention, an alignment mechanism is provided for precisely adjusting the position of upper and lower plates of an optical assembly, such as a mount for a mirror, relative to each other. The mechanism includes threaded holes placed in a corner of each of the plates of the optical assembly. The threaded holes in each of two plates preferably are provided with different pitches. A threaded lead screw engages both holes and has a first set of threads with a pitch substantially equal to the pitch of the threaded hole in the lower plate and a second set of threads having a pitch substantially equal to the pitch of the threaded hole in the upper plate. The lead screw is rotatable with respect to the holes in the lower and upper plates and forms a differential thread which advantageously provides a much smaller relative displacement (typically less than 0.005") of the plates for each 360 degree turn of the lead screw. By way of contrast, a similar arrangement which does not use differential threads would only provide a relative displacement of the plates on the order of 0.030" for each 360 degree turn of the lead screw.

In accordance with another aspect of the present invention, the threaded holes may be provided with a locking thread. The locking thread eliminates backlash between the lead screw and the threads of the holes in the plates, thereby permanently preserving the alignment established by rotating the screw after the alignment operation has been completed.

In accordance with yet another aspect of the present invention, the threaded holes in each plate may be placed on opposing corners of the plate while fixing the position of one of the other corners to form an adjuster which is capable of adjusting the position of the upper and lower plates in two orthogonal directions. The threaded holes are preferably formed by the provision of helical thread inserts, and the locking thread is preferably formed from a plurality of chords in a single thread of the thread inserts.

According to yet another aspect of the present invention, a method is provided for precisely and permanently positioning a plurality of elements of an optical assembly, such as an end mirror, with respect to each other. The method includes the steps of providing threaded holes with unequal thread pitches on at least one corner of each of the elements of the optical assembly and including a locking device in each of the threaded holes. A lead screw is provided with two sets of threads of unequal pitch to form a differential thread. The lead screw is then engaged with the threaded holes and rotated to adjust the position of the elements of the optical assembly with respect to each other until the elements are correctly positioned. After the positional adjustment has been made, the locking device in the threaded holes prevents additional movement of the lead screw with respect to the threaded holes. The locking device therefore insures that the position adjustment is substantially stable over time.

In a second embodiment of the present invention, an apparatus is provided for precisely positioning a first element of an optical assembly with respect to a second element of an optical assembly. The apparatus includes a cavity formed in the second element and a boss having a corresponding shape formed in the first cavity. The boss has dimensions slightly greater than those of the cavity and is provided with a thin outer wall capable of being inserted into the cavity upon the application of a compressive force between the first and second elements. The outer wall is made thin enough so that it flexes during insertion of the boss into the cavity, thereby minimizing the insertion force required to mate the cavity and boss.

According to another aspect of the second embodiment, the cavity and boss both have a circular cross section in a plane perpendicular to the direction in which the boss is inserted into the cavity, and the outer wall of the boss has a diameter greater than the amount of the cavity by an amount ranging from approximately 0.001 inches to approximately 0.003 inches.

In a third embodiment of the present invention, an optical alignment device is provided for aligning components of an optical system. The alignment device includes a spherical housing with an optical element, typically an end mirror, placed within the spherical housing. The alignment device also includes a spherical socket having dimensions corresponding to those of the spherical housing. The spherical socket contains the spherical housing, which has a geometry allowing the angular position of the spherical housing and included optical element to be adjusted within the spherical socket. The alignment device also includes a void space between the spherical socket and housing into which an adhesive may be injected when the optical element has been correctly positioned within the housing.

According to yet another embodiment of the present invention, an alignment assembly is provided for precisely aligning an optical axis of a laser tube in a Raman scattering gas analyzer with an end mirror. The alignment assembly includes first and second support plates and threaded holes placed in at least one corner of the first and second support plates. The threads in the threaded holes have unequal pitch and are provided with at least one locking thread. A threaded fastener engageable with each of the threaded inserts is provided. The fastener and threaded holes form a differential thread which is capable of very fine adjustment, and the locking thread in the threaded holes engages the threaded fastener to fix the position of the threaded fastener with respect to the threaded inserts after the threaded fastener has been engaged with the threaded inserts.

The alignment assembly also includes a cavity formed on the upper surface of the second plate and a supporting element which has a boss formed on its bottom end. The boss has a shape corresponding to the shape of the cavity formed on the upper surface of the second plate, and the boss includes an outer wall having dimensions greater than those of the cavity. The outer wall is suitable for mating with the cavity and is capable of flexing when the outer wall is inserted into the cavity, thereby minimizing the engagement force required to insert the boss into the cavity. The alignment assembly also includes a spherical socket mounted within the above housing. The spherical socket contains the end mirror of a laser resonator and is capable of being moved within the housing so that the angular position of the mirror can be precisely adjusted with respect to the plasma tube's optical axis.

A fourth embodiment of the invention is an apparatus for making fine adjustments in an optical system comprising: a first structural component having a first threaded hole therein, the first threaded hole having a first thread pitch; a second structural component having a second threaded hole therein, the second threaded hole having a second thread pitch; and a first lead screw having a longitudinal axis and a first set of threads extending from a first end of the first lead screw toward a midpoint along the first lead screw longitudinal axis and a second set of threads extending from a second end of the first lead screw toward the midpoint, wherein the first set of first lead screw threads has a pitch substantially equal to the first thread pitch and the second set of threads has a pitch substantially equal to the second thread pitch, the first threaded lead screw engaging the first and second threaded holes in the first and second structural components thereby joining the first and second structural components, the first lead screw and threaded holes forming a differential thread having an equivalent pitch which is substantially less than both of the first and second thread pitches to finely adjust the position of the first and second structural components relative to each other. This embodiment may further comprise a locking thread placed in at least one of the threaded holes, the locking thread engageable with the first lead screw to reduce backlash between the first lead screw threads and the threaded holes and to retard motion of the first lead screw with respect to the first and second structural components. Additionally, the first lead screw may further comprise a locking thread, the locking thread engageable with either of the first threaded hole or the second threaded hole to reduce backlash between the first lead screw threads and the threaded holes and to retard motion of the first lead screw with respect to the first and second structural components. In a further aspect of this embodiment, the optical assembly comprises an end of a resonant cavity in a laser activated Raman scattering analyzer. At least one of the first and second threaded holes may further comprise a helical coil having a plurality of turns. Furthermore, the locking mechanism may comprise a plurality of substantially linear chords configured in at least one of the plurality of turns. In another aspect, this embodiment may further comprise a second lead screw joining the first and second structural components through a third threaded hole having a third thread pitch in the first structural component and a fourth threaded hole having a fourth thread pitch in the second structural component, wherein the second lead screw and the third and fourth threaded holes form a differential thread having an equivalent pitch which is substantially less than both of the third and fourth thread pitches. In this aspect, the first lead screw may be positioned along a first axis and the second lead screw may be positioned along a second axis, the first and second axes intersecting to form an angle with respect to each other. This aspect of the invention may further comprise a pivot point at the intersection of the first and second axes wherein the angle of intersection is substantially 90 degrees.

A fifth embodiment of the invention is a positioning assembly for precisely locating adjacent elements of an optical system with respect to each other, the positioning assembly comprising: a threaded hole placed in each of the optical system elements, the threaded holes having thread pitches which are unequal, the threaded holes further including a locking means; and a lead screw having two sets of threads of unequal pitch, the threaded lead screw engaging the threaded holes in the optical system elements to form a differential thread, wherein the differential thread is suitable for precisely adjusting the relative position of the optical system elements relative to each other, the lead screw engaging the locking means to prevent backlash between the lead screw and the threaded holes, the lead screw and threaded holes thereby precisely and stably positioning the optical system elements relative to each other. In this embodiment, the locking means may comprise a plurality of substantially linear chords formed in a single thread. Alternatively, the locking means may comprise a deformed thread in the lead screw. Thus, the differential thread may have an effective pitch which is greater than 200 threads per inch.

A sixth embodiment of the invention is a method for precisely and securely positioning a plurality of elements of an optical assembly with respect to each other, comprising the steps of: providing threaded holes with unequal thread pitches on at least one location of each of the elements of the optical assembly, the threaded holes including a locking device; providing a lead screw with two sets of threads of unequal pitch; engaging the lead screw with the threaded holes and the locking device; rotating the lead screw with respect to the threaded holes, thereby adjusting the position of the elements of the optical assembly with respect to each other until the elements are correctly positioned, wherein the locking device prevents additional movement of the lead screw with respect to the threaded holes after the position adjustment has been made, so that the position adjustment is substantially stable over time.

A seventh embodiment of the invention is an apparatus for precisely positioning first and second elements of an optical assembly with respect to each other, the apparatus comprising: a cavity formed in the second element; and a boss formed in the first element, the boss having profile dimensions greater than those of the cavity, the boss having a shape corresponding to that of the cavity, the boss including an outer wall having a thickness which is small in relation to the dimensions of the cavity, the outer wall capable of being inserted into the cavity upon the application of a compressive force between the first and second elements, the thickness of the outer wall allowing the boss to flex during insertion of the boss into the cavity, the apparatus thereby providing a precise axial fit between the first and second elements without the necessity for the employment of large compressive forces between the first element and the second element. In this embodiment, the cavity and the boss may have a circular cross section in a plane perpendicular to the direction in which the boss is inserted into the cavity. Additionally, the boss may have a diameter which is greater than that of the cavity by an amount which is in the range of from approximately 0.001 inches to 0.003 inches.

A eighth embodiment of the invention is an apparatus for precisely positioning first and second elements of an optical assembly with respect to each other, the apparatus comprising: a cavity formed in the second element; and a boss formed in the first element, the boss having profile dimensions greater than those of the cavity, the boss having a shape corresponding to that of the cavity, the cavity including an outer wall having a thickness which is small in relation to the dimensions of the cavity, the outer wall capable of being joined with the boss upon the application of a compressive force between the first and second elements, the thickness of the outer wall allowing the cavity to flex during insertion of the boss into the cavity, the apparatus thereby providing a precise axial fit between the first and second elements without the necessity for the employment of large compressive forces between the first element and the second element.

A ninth embodiment of the invention is an apparatus for precisely aligning a longitudinal axis of a first element with a longitudinal axis of a second element of a resonant cavity in a laser-activated Raman scattering gas analyzer comprising: a cavity formed in the first optical element, the cavity having a circular cross section in a plane which is substantially perpendicular to the first element longitudinal axis and the cavity substantially centered on the first element longitudinal axis, the cavity having an internal diameter; and a boss formed on the second optical element, the boss having a circular cross section in a plane which is substantially perpendicular to the second element longitudinal axis and the boss substantially centered on the second element longitudinal axis, the boss having an outer wall diameter which is slightly greater than the cavity internal diameter, the outer wall having a thickness which allows the outer wall to flex when the boss is inserted into the cavity, the outer wall thereby allowing the boss to precisely engage the cavity while minimizing the force required to engage the boss with the cavity, such that the longitudinal axis of the first element is precisely aligned with the longitudinal axis of the second element when the boss is inserted into the cavity. In this embodiment, the first element may comprise a plasma tube and the second element may comprise a gas cell. Alternatively, the first element may comprise a gas cell and the second element may comprise an end cavity reflector.

A tenth embodiment of the invention is an optical alignment device, comprising: a ball element having a substantially spherical portion; a socket element having a substantially spherical portion which matches the ball element substantially spherical portion such that the ball element substantially spherical portion joins with the socket element substantially spherical portion to form a ball and socket connection with at least one void region formed between the ball element and the socket element; and an adhesive in the void region for locking the ball element and the socket element in a specific relative orientation with respect to each other. This embodiment may further comprise a mirror mounted to one of the ball element or the socket element.

An eleventh embodiment of the invention is a Raman gas analyzer comprising: a laser having a resonant cavity which defines an optical axis; and a mirror located at one end of the resonant cavity, the mirror mounted on a ball and socket mount for adjusting the position of the mirror with respect to the optical axis. In this embodiment, the ball and socket mount may further comprise a ball portion and a socket portion with a cavity therebetween, the cavity having an opening for receiving adhesive material into the cavity.

An twelfth embodiment of the invention is an apparatus for aligning an optical axis of a laser in a Raman scattering gas analyzer with an end mirror, the apparatus comprising: first and second support plates, the first and second plates including upper and lower surfaces; threaded holes placed in at least one corner of the first and second support plates, the threaded holes having threads of unequal pitch and at least one locking thread; a threaded fastener engageable with each of the threaded holes, the threaded fastener and the threaded holes forming a differential thread capable of fine adjustment, the locking thread of the threaded holes engaging the threaded fastener to fix the position of the threaded fastener with respect to the threaded holes after the threaded fastener has been engaged with the threaded inserts; a cavity formed on the upper surface of the second plate; a supporting element including top and bottom ends and a boss formed on the bottom end, the boss having a shape corresponding to the shape of the cavity formed on the upper surface of the second plate, the boss including an outer wall having dimensions greater than those of the cavity, the outer wall suitable for mating with the cavity, the outer wall capable of flexing when the outer wall is inserted into the cavity, thereby minimizing the engagement force required to insert the boss into the cavity; a housing formed on the top end of the supporting element; and a spherical socket mounted in the housing, the spherical socket containing the mirror, the spherical socket capable of being moved in the housing so that the angular position of the mirror with respect to the optical axis can be varied so that the mirror can be precisely fixed with respect to the optical axis. This embodiment may further comprise a Brewster prism mounted on the supporting element in front of the mirror, the prism polarizing light incident from the laser tube on the mirror into a desired polarization state and selecting a specific resonant wavelength.

A thirteenth embodiment of the invention is a Raman gas analyzer system comprising: a gas cell having an end connection plate with a circular cavity having a cavity diameter formed therein, the circular cavity having a center which is aligned with a central optical axis of the gas cell; an optical assembly having a connection plate with a circular boss having a boss diameter formed thereon, the circular boss having a center which is aligned with a central optical axis of the optical assembly, wherein the boss diameter is slightly larger than the cavity diameter such that the mating of the boss with the cavity forms a press fit and aligns the central optical axis of the gas cell with the central optical axis of the optical assembly, the boss further comprising a thin flexible wall which is capable of flexing when the boss is inserted into the cavity, thereby minimizing the engagement force required to achieve the press fit; and a wobble plate connected to the optical assembly connection plate by a lead screw, wherein the lead screw has threads on a first end having a first pitch and threads on a second end having a second pitch, wherein first end of the lead screw engages a first threaded hole in the optical assembly connection plate having threads of the first pitch and the second end of the lead screw engages a second threaded hole in the wobble plate having threads of the second pitch thereby forming a differential thread connection between the optical assembly connection plate and the wobble plate having an effective thread pitch which is substantially less than the first and second thread pitches.

The alignment device of the present invention therefore provides a mechanism for precisely fixing the alignment of elements in an optical system. In particular, the present invention is advantageously employed to precisely align the end mirror and associated Brewster prism of a laser resonant cavity with respect to the plasma discharge tube in a Raman scattering gas analyzer. The alignment provided by the present invention between the end mirror and discharge tube axis is substantially permanent, since the alignment is locked into place by the locking threads of the support elements and adhesive placed within the spherical housing mounting the mirror after the alignment operation is completed. The ease and permanence with which the alignment is effected advantageously allows repair operations on Raman analyzers to more easily be performed in the field, thereby minimizing the expense and delay associated with repair or cleaning of the optics of such gas analyzers.

These and other characteristics of the present invention will become apparent through reference to the following detailed description of the preferred embodiments and accompanying drawings.

DETAILED DESCRIPTION OF THE PREFERRED EMBODIMENTS

Figure 1:
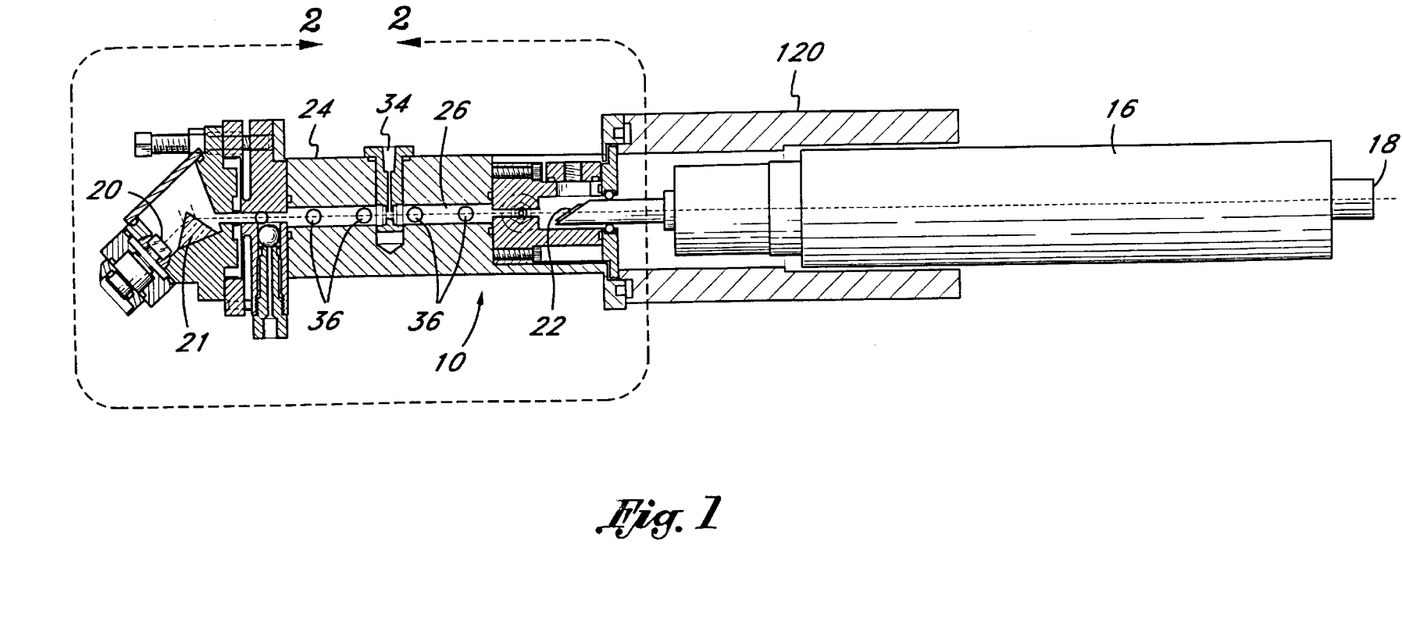
FIG. 1 illustrates a Raman gas analysis system with a sample gas cell located within a laser resonant cavity including the optical alignment devices of the present invention.

As shown in FIG. 1, the alignment apparatus of the present invention is advantageously employed to align the optics of a gas analysis cell 10 within a resonant cavity of a laser in a Raman gas analysis system. The resonant cavity includes a plasma discharge tube 16 and has a volume which is defined by a first reflector 18 and a second reflector 20. The first reflector 18 is preferably a high reflectivity mirror having a reflectivity greater than 99.99%. The reflector 20 preferably comprises a second high reflectivity mirror. A Brewster prism 21 is preferably inserted in the cavity to select a particular wavelength and polarization state of light for circulation within the resonant cavity. A lasing gas mixture capable of lasing is confined within the plasma discharge tube 16 and a Brewster window 22 is positioned at the end of the discharge tube 16 adjacent the output such that the light beam propagating within the cavity enters and exits the discharge tube 16 through the Brewster window 22.

Figure 2:
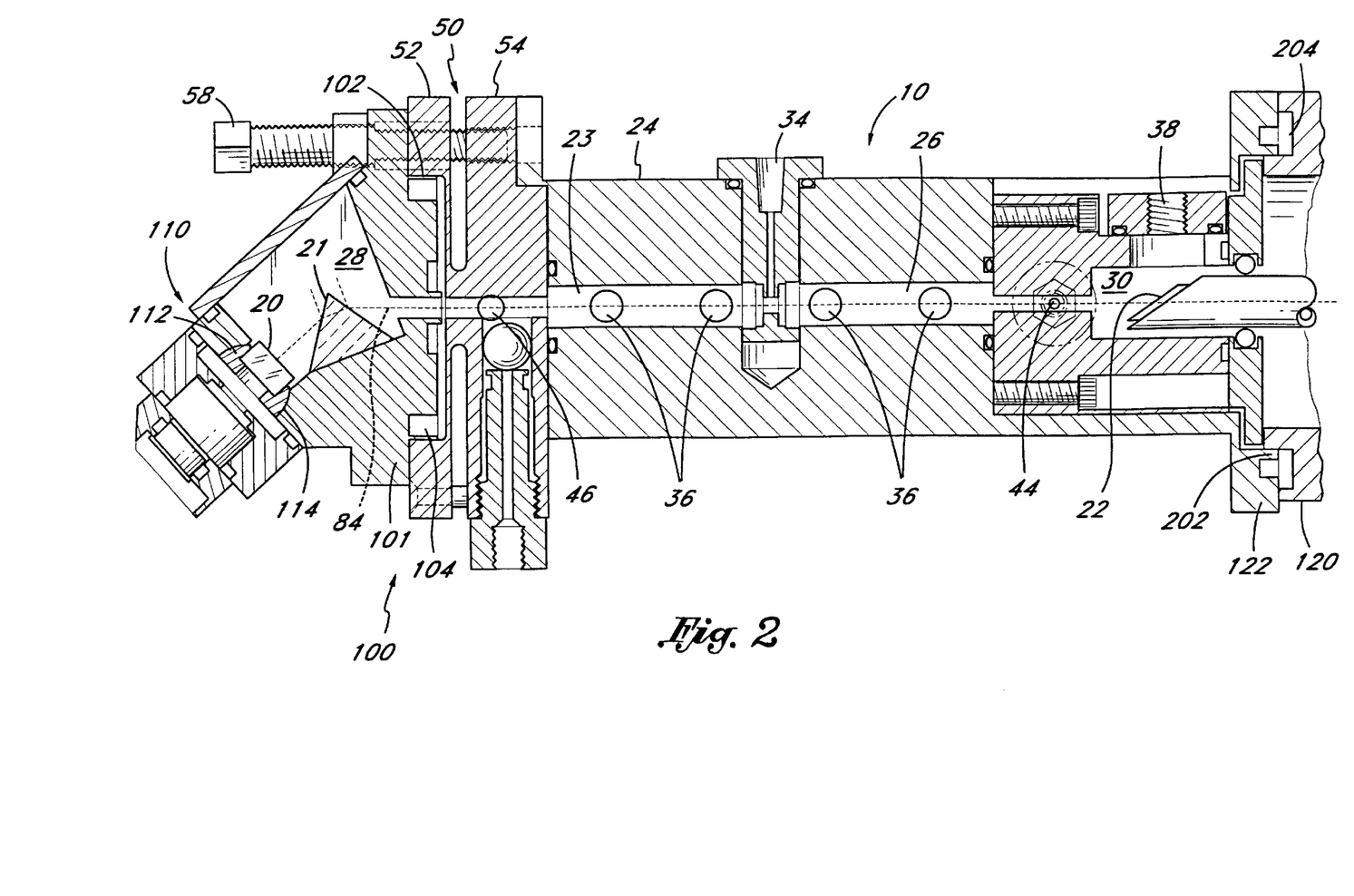
FIG. 2 is an enlarged view of a portion of the Raman gas analysis system illustrated in FIG. 1 showing details of the sample gas cell and optical alignment devices of the present invention.

Referring to FIGS. 1 and 2, the gas analysis cell 10 is positioned intermediate the Brewster window 22 and second reflector 20 within the laser resonant cavity. The analysis cell 10 comprises a housing 24 enclosing an analysis chamber 26. The analysis cell 10 includes two buffer gas regions 28 and 30 on either end of the analysis chamber 26. The analysis chamber 26 is connected to a source of sample gas to be analyzed by a gas sample inlet port 34. The gas analysis cell 10 further comprises a plurality of output channels 36 which have optical axes approximately perpendicular to the optical axis of the laser resonator and which form optical passageways between the analysis chamber 26 and the outside of the gas cell 10. A first buffer gas input port 38 is connected to the buffer region 30 adjacent the Brewster window 22 and a second buffer gas input port (not shown) is connected to the buffer region 28 adjacent the Brewster prism and second reflector 20. Additionally, the cell includes a first output port 44 connected to the buffer region 30 at the end of the analysis chamber 26 nearest the Brewster window 22. The output port 44 is positioned intermediate the gas sample inlet port 34 and the first buffer gas inlet port. A second output port 46 is connected to the buffer region 28 at the end of the analysis chamber nearest the second reflector 20. The output port 46 is positioned intermediate the gas sample inlet port 34 and the second buffer gas inlet port.

A gas sample which is to be analyzed enters the sampling cell 10 through the input port 34 and is contained within the analysis chamber 26. The laser discharge tube 16 emits a collimated beam of light having characteristic wavelengths dependent upon the type of gas within the discharge tube 16. The wavelength(s) of light which resonate within the cavity is(are) selected from the characteristic wavelengths by the orientation of the Brewster prism 21, and the nature of the mirrored coating on the reflecting end mirrors 18 and 20. The light beam travels an optical path through the Brewster window 22 and through the length of the analysis chamber 26 of the gas analysis cell 10, through Brewster prism 21 and is incident upon the second reflector 20. The length of the resonant cavity is such that the light beam resonates between the first and second reflectors 18 and 20 which define the length of the resonant cavity. Thus, the emitted light propagates within the resonant cavity, entering and exiting the discharge tube 16 through the Brewster window 22, thereby stimulating further emission of additional excited atoms within the discharge tube and achieving optimum light amplification. The Brewster prism 21 optimizes the power of a preferred wavelength and polarization state of the laser beam circulating in the resonant cavity. Brewster window 22 serves to seal the gas within the discharge tube 16 while also providing polarization control of the light beam by completely transmitting light of a preferred polarization state.

Inside the analysis chamber 26 of the sample cell 10, the light beam circulating in the resonant cavity passes through the sample of the gas to be analyzed. The Raman scattered radiation from the gas sample is collected over as large a solid angle as possible by individual detector channels 36, which are located approximately perpendicular to and on either side of the axis of the laser light beam propagating inside the analysis chamber 26. The Raman signals can then be collected by optics, sensed by detectors and analyzed with a microprocessor (not shown) associated with the detector channels 36 and, based on this analysis, the identity and concentration of each specific gas comprising the gas sample contained within the analysis chamber 26 can be determined. A more detailed description of this analysis process can be found in U.S. Pat. No. 4,784,486, entitled "MULTI-CHANNEL MOLECULAR GAS ANALYSIS BY LASER-ACTIVATED RAMAN LIGHT SCATTERING", issued to Van Wagenen et al., assigned to the assignee of the present application and incorporated herein by reference. Further detailed descriptions of various aspects of Raman Gas Analysis systems are disclosed in commonly assigned U.S. Pat. No. 5,135,304, entitled "GAS ANALYSIS SYSTEM HAVING BUFFER GAS INPUTS TO PROTECT ASSOCIATED OPTICAL ELEMENTS", issued to Miles et al.; U.S. Pat. No. 5,153,671, entitled "GAS ANALYSIS SYSTEM HAVING BUFFER GAS INPUTS TO PROTECT ASSOCIATED OPTICAL ELEMENTS", issued to Miles; and U.S. Pat. No. 5,245,405, entitled "CONSTANT PRESSURE GAS CELL", issued to Mitchell et al., each of which is hereby incorporated herein by reference.

Self Locking Differential Lead Screw for Zero Backlash Positioning

FIGS. 2–6 illustrate a self locking, differential lead screw alignment device for zero backlash positioning in accordance with the present invention. This alignment device is illustrated generally at 50. The alignment device 50 includes an upper plate 52 and a lower plate 54. The plates 52 and 54 are connected by a screw 56 which establishes a pivot point and adjustable lead screws 58 and 60. The threaded lead screws 58 and 60 are engaged with threaded holes 62 and 64 which pass through both the upper and lower plates 52 and 54. As illustrated in FIG. 2, the lower plate 54 is mounted to the housing 24 so that its central axis 84 is coextensive with the central axis 23 of the optical system. The threads of the hole 62 located in the upper plate 52 preferably have a different pitch than the threads located in the lower plate 54. Similarly, the threads of the hole 64 located in the upper plate 52 have a different pitch than the threads located in the lower plate 54. Screws 58 and 60 are provided with corresponding threaded portions 66 and 68 (shown only on the lead screw 58 but likewise present on the lead screw 60) which include threads having a pitch equal to the thread pitch in the lower and upper plates respectively. Together with the threaded portions of the holes 62 and 64, the lead screws 58 and 60 each form a differential thread. In one embodiment of the invention, the upper plate 52 is provided with a hole having a ¼–28 UNF threaded hole, i.e, a diameter of approximately 0.25 inches and 28 threads per inch. Similarly, the lower plate 54 is provided with, a 10–32 UNF threaded diameter hole having 32 threads per inch. This differential thread combination of 28 threads per inch and 32 threads per inch results in an equivalent thread pitch of 224 threads per inch. In general, the equivalent thread pitch for this type of differential thread configuration where one thread pitch is A and the other thread pitch is B is given by $$\frac{1}{A} - \frac{1}{B}$$

Thus, in the above example where A=28 and B=32, the equivalent thread pitch is $$\frac{1}{28} - \frac{1}{32} = \frac{32}{28 \times 32} - \frac{28}{28 \times 32} = \frac{4}{896} = \frac{1}{224}$$

Figure 3:
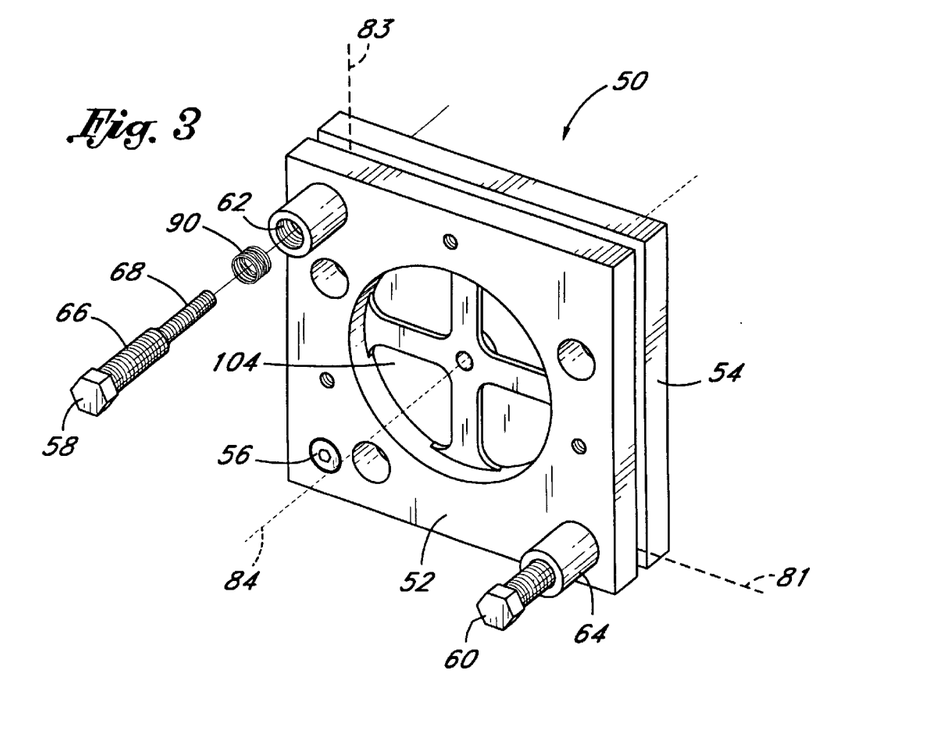
FIG. 3 is an exploded perspective view of a self locking differential lead screw alignment device for zero backlash positioning according to the present invention.
Figure 4:
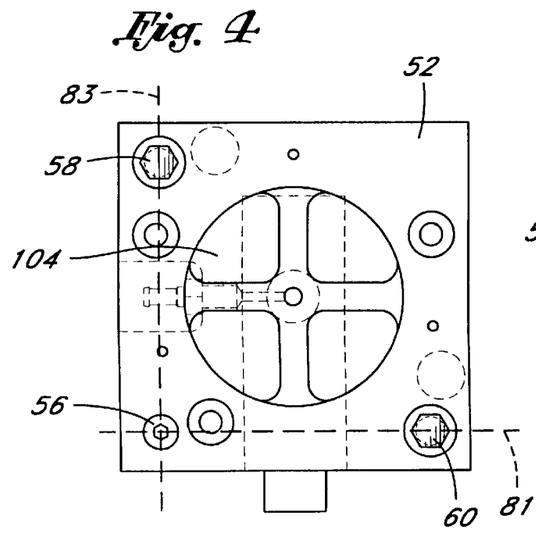
FIG. 4 is a top view of the alignment device illustrated in FIG. 3.
Figure 5:
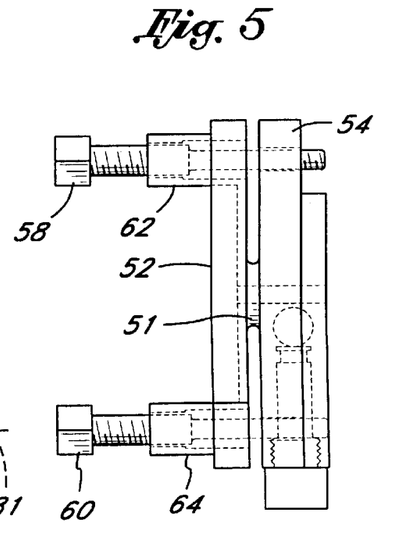
FIG. 5 is a side view of the alignment device illustrated in FIG. 3.

As shown in FIG. 5, upper plate 52 and lower plate 54 are attached by a flexible web 51 such that plates 52 and 54 do no translate with respect to each other along axes 81 and 83 or rotate with respect to each other around axis 84. As shown in FIGS. 3, 4 and 5, the lead screws 58 and 60 are mounted on opposite corners of the plates 52 and 54. This arrangement of the lead screws, together with the provision of the pivot screw 56 located at another corner of plates 52 and 54, allows the position of the upper plate 52 to be adjusted with respect to that of the lower plate 54 along two mutually perpendicular axes 81 and 83. Axis 81 extends between the plates 52 and 54 along a line which connects pivot screw 56 with lead screw 60. Similarly, axis 83 extends between the plates 52 and 54 along a line which connects pivot screw 56 with lead screw 58. From FIG. 4 it can be seen that rotating the lead screw 58 alone effectively results in a rotation of plate 52 with respect to plate 54 about the axis 81. Similarly, rotating the lead screw 60 alone effectively results in a rotation of plate 52 with respect to plate 54 about the axis 83. Consequently, the angle that the central axis 84 of the plate 52 makes with the longitudinal axis of the plate 54 (which corresponds to the optical axis 23 of the laser tube when the assembly 50 is mounted in the Raman analyzer 10) may be precisely adjusted in both orthogonal directions by turning the lead screws 58 and 60. Rotation of the lead screws 58 and 60 therefore allows the user to vary the angle that the optics mounted on the upper plate 52 make with respect to the optical axis of the plasma discharge tube 16. The extremely fine effective thread pitch provided by the differential thread advantageously allows very accurate adjustment to be made of the angle between the axis 84 and the central axis 23 of the laser tube and the discharge tube 16.

Figure 6:
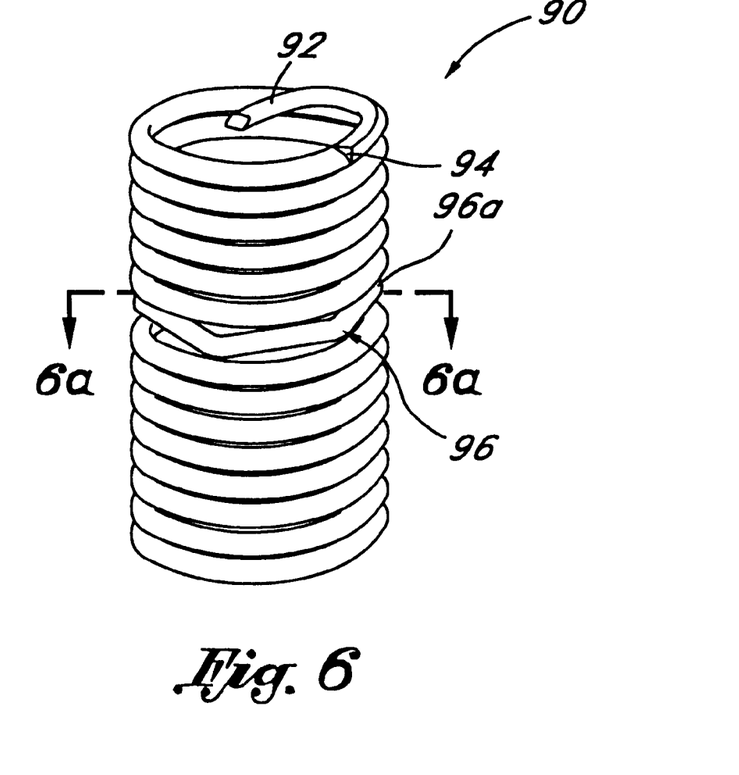
FIG. 6 is a perspective view of a threaded insert placed in the alignment device illustrated in FIG. 3.
Figure 6A:
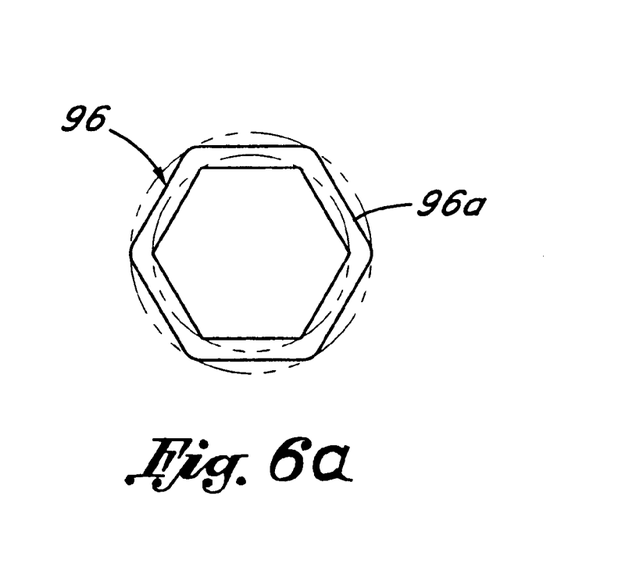
FIG. 6a is a cross section view of a locking coil of the threaded insert illustrated in FIG. 6.

The holes 62 and 64 are preferably provided with helically-threaded inserts 90, as illustrated in more detail in FIGS. 6 and 6a. In the preferred embodiment of the invention, each of the threaded boreholes 62 and 64 is separately provided with the helically-threaded inserts 90 in both the upper plate 52 and lower plate 54. As described above, the threaded inserts 90 which are provided on the lower plate have a different pitch than those provided on the upper plate 54, thereby providing the differential thread described above by mating with the respective threads 66 and 68 on each of the bolts 58 and 60.

The threaded inserts 90 include a driving tang 92 and a notch 94 and are inserted into each of the holes 62 and 64 by a special tool (not shown) which is readily available commercially. The driving tang 92 mates with the insertion tool to aid in installation of the insert. Once the insert is installed, the notch 94 facilitates the removal of the driving tang 92 from the insert 90 without damaging the insert. One such type of threaded insert is sold under the tradename of HELI-COIL threaded inserts which are manufactured by Helicoil located in Danbury, Conn. The threaded inserts preferably include a locking coil 96 which comprises a series of straight chords a on at least one coil 96 of the threaded insert 90. The chords a give the locking thread 96 a generally hexagonal cross section as shown in FIG. 6a. The chords a lock the threaded bolts 58 and 60 in place by expanding (and therefore applying a reaction force) when the bolts 58 and 60 are threaded through them. While the locking thread has been described in terms of locking threads of hexagonal cross section, it should be understood that other types of locking thread, such a concave locking thread, could be chosen as well as long as they provide a positive locking action between the bolts 58 and 60 and the threaded inserts 90. Other conventional types of self-locking thread configurations may also be used. The provision of threaded inserts 90 allows the employment of locking threads 96 which advantageously provides a substantial frictional force and therefore a positive lock for the bolts 58 and 60 after they have been adjusted, thereby eliminating or substantially reducing backlash between the bolts 58 and 60 and the plates 52 and 54 and assuring a stable alignment of the plate's optical axis 84 with the optical axis of the plasma discharge tube 16. An alternate form of self-locking thread configuration includes a thread deformation formed on either of the male or female threads.

Low Force Interference Fit Mechanical Interface

Figure 7:
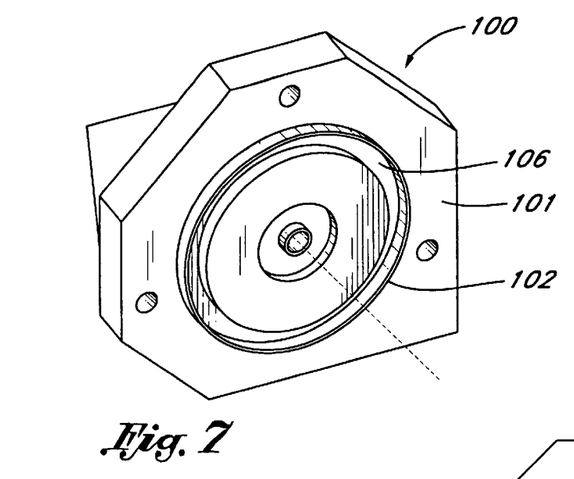
FIG. 7 is a perspective view of a low force, interference fit mechanical interface optical alignment device of the present invention.
Figure 8:
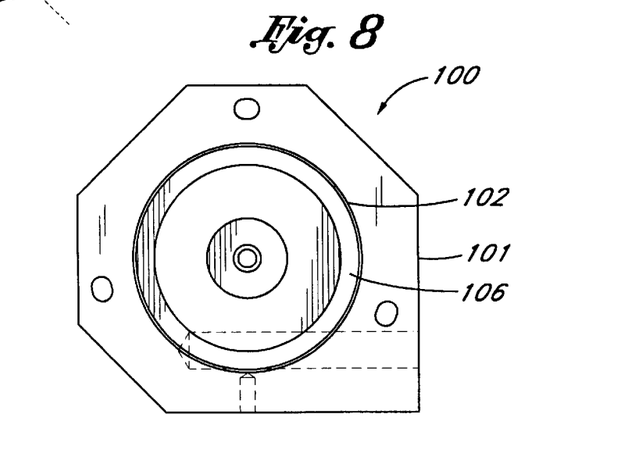
FIG. 8 is a bottom view of the device illustrated in FIG. 7.

FIGS. 2, 7 and 8 illustrate a low force interference fit mechanical interface optical alignment feature of the present invention at 100. An interference fit interface between two components of the optical system prevents lateral movement via an oversized thin wall boss in a first component that flexes for insertion into a slightly smaller cavity formed in an adjacent second component. When used in conjunction with a circular boss and cavity, it enables rotation of the first component with respect to the second component about a common centerline without permitting relative lateral movement of the two components. This alignment feature of the invention includes a plate 101 to which is mounted the cavity end mirror 20 (see FIG. 2). As shown in FIGS. 2, 7 and 8 a thin wall boss 102 is located on the lower side of the plate 101. The thin wall boss 102 has an outer diameter which is slightly greater diameter than the inner diameter of a corresponding cavity 104 (see FIGS. 2, 3 and 4) formed in the upper plate 52 into which it is press fit. The central axes of the thin wall boss 102 and cavity 104 are coaxial, so that a very precise longitudinal alignment of the central axes of the thin wall boss and cavity is achieved when the two objects are press fit together. The central axes of the plate 101 and cavity 104 correspond to the axis 23 of the laser cavity when the axis 84 of the plate 52 has been correctly aligned with the axis 23 of the laser cavity.

The outer diameter of the thin wall boss 102 is preferably on the order of 0.001 inch greater than the inner diameter of the cavity 104, with a tolerance of +0.001 inch, –0.000 inch. The slightly greater diameter of the thin wall boss 104 assures a positive interference fit between the cavity 104 and thin wall boss 102 when the two objects are mated together. The thin wall boss 102 is preferably thin enough and long enough to be somewhat flexible. In one embodiment of the invention, the thickness of the thin wall boss 102 is between 0.01 and 0.02 inches.

The relatively small thickness of the thin wall boss 102 in relation to its outer diameter allows it to flex during insertion into the cavity 104. This flexing allows the thin wall boss 102 to mate with the cavity 104 with the application of only a relatively small compressive force between them, thereby eliminating the need for a press or other machine to mate the thin wall boss 102 with the cavity 104. If a greater locking force between the thin wall boss 102 and cavity 104 is desired, the thickness of the thin wall boss 102 may be made thicker.

In the embodiment of the invention illustrated in FIGS. 7 and 8, the thin wall boss 102 had a generally circular shape. The provision of such a circular shape allows the plate 101 to be rotated with respect to the plate 52 while the optical axes of the respective plates remain aligned. It should be understood, however, that the thin wall boss 102 and cavity 104 could be provided with other shapes, for example, triangular, rectangular, hexagonal, square, etc, if such a rotational property is not required. In the embodiment illustrated in FIGS. 7 and 8, the thin wall boss 102 is constructed by first machining a solid boss of the desired outer diameter, then machining a relief groove 106 having an outer diameter selected to result in the desired wall thickness for the thin wall boss 102.

A similar connection between the gas cell 10 and a housing 120 for the plasma tube 16 is shown in FIG. 2. Gas cell 10 has a flange 122 which includes a thin wall boss 202 similar to the previously described thin wall boss 102. Thin wall boss 202 has an outer diameter which is slightly greater diameter than the inner diameter of a corresponding cavity 204 formed in the end of plasma tube housing 120 into which it is press fit. As previously described, this provides a connection between the gas cell 10 and plasma tube housing 120 which facilitates the alignment of the longitudinal axes of the two components, such that a very precise longitudinal alignment of the central axes of the two components is achieved when the two objects are press fit together. Additionally, since the thin wall boss 202 is flexible, the two components may be easily disassembled. This makes field replacement of the plasma tube much easier, as the plasma tube 16 may be mounted and prealigned in the housing 120 at the factory.

While the above description of the low force interference fit mechanical interface has been described with the boss having a flexible wall, it will be understood that the flexible wall could alternatively be located on the cavity.

Ball and Socket Wobble Plate

As shown in FIG. 2, the plate 101 includes a mounting for the Brewster prism 21 and the end mirror 20. Light traversing the optical axis 23 of the laser cavity impinges on the Brewster prism 21 at an angle approximately equal to Brewster's angle. The Brewster prism therefore selects a lasing wavelength for the incident laser light and bends the light so that it is normally incident on the end mirror 20. The laser light is re-reflected by the end mirror 20 through the Brewster prism and back into the plasma tube.

Figure 9:
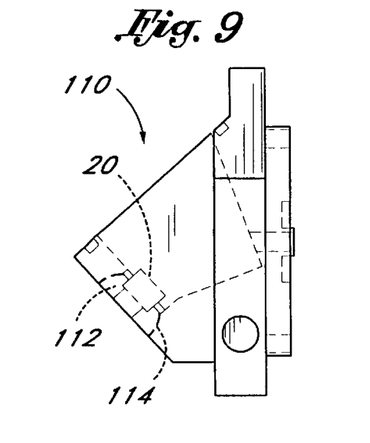
FIG. 9 is a cross-sectional view of a ball and socket wobble plate optical alignment device of the present invention.
Figure 10:
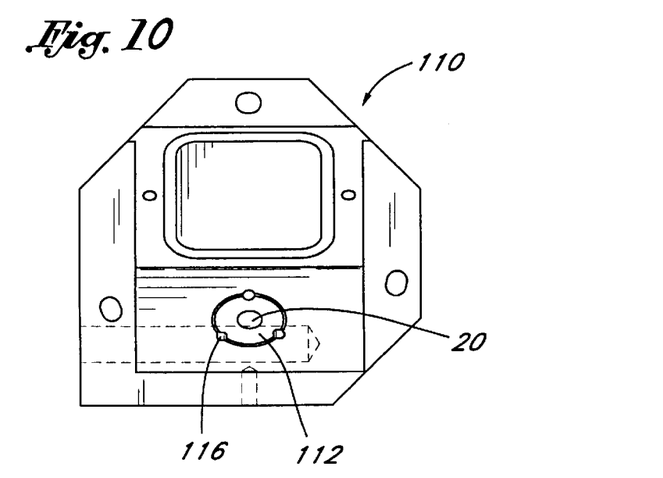
FIG. 10 is a top view of the device illustrated in FIG. 9.

FIGS. 2, 9 and 10 illustrate a ball and socket wobble plate feature of the present invention at 110. The ball and socket wobble plate alignment apparatus comprises a housing 112, a portion of which is substantially spherical, positioned within a socket 114, a portion of which is also substantially spherical. The end mirror 20 of the laser cavity is mounted to the spherical housing 112.

The geometry of the spherical socket 114 allows the spherical housing 112 to be moved within the socket, thereby varying the angle that the normal to the mirror 20 makes with the optical axis of the system. The angular orientation of the mirror 20 is adjusted while monitoring the system power and is then fixed in a position which maximizes the system power.

The spherical socket 114 has a slightly greater diameter than the spherical housing 112, thereby providing a small void space (not shown) into which a suitable adhesive, for example epoxy, silicone, etc., is injected through holes 116 which serve as adhesive pockets located at the interface between the housing 112 and socket 114. Injection and subsequent curing of the adhesive in the space between the housing 112 and socket 114 forms a thin bond line between the socket 114 and housing 112 which permanently secures the proper alignment of the mirror 20 with respect to the optical axis of the system.

The above-described embodiments of the present invention provide mechanisms for accurately and permanently aligning the elements of an optical system. The alignment mechanisms are simple, easily constructed, and easily used. The alignment mechanisms of the present invention advantageously allow many disassembly and repair operations to be performed on optical systems in the field without the need for the systems to be returned to the factory for re-adjustment and reassembly. The alignment provided by the mechanisms of the present invention is also very robust, thereby allowing the system to maintain optimum alignment notwithstanding rough usage or shocks endured while shipping.

It will be understood that the apparatus and method of the present invention for precision optical alignment features may be employed with many types of optical systems including Raman gas analysis systems. Thus, there are numerous other embodiments of the invention which will be obvious to one skilled in the art. The apparatus and method of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An optical alignment device, comprising:

first and second support structures, wherein said first support structure includes a cavity and said second support structure includes a boss, said cavity and said boss having similar shapes such that said boss is insertable into said cavity, said boss further including a flexible outer wall having dimensions greater than those of said cavity and configured for mating with said cavity, wherein said boss flexible outer wall flexes when said boss is inserted into said cavity, thereby minimizing the engagement force required to insert said boss into said cavity; and a ball and socket mounting element positioned on either of said first or second support structures.

2. The optical alignment device of claim 1 further comprising a mirror mounted to said ball and socket mounting element.

3. A Raman gas analyzer comprising:

a laser having a resonant cavity which defines an optical axis;

a gas cell positioned within said resonant cavity, wherein an optical axis of said gas cell is aligned with said optical axis of said resonant cavity, said gas cell having an end connector with a circular cavity formed therein, said circular cavity defining a cavity diameter and a center which is aligned with said optical axis of said gas cell; and an optical assembly having a circular boss formed thereon, said circular boss defining a boss diameter and a center which is aligned with a central optical axis of said optical assembly, wherein said boss diameter is slightly larger than said cavity diameter such that the mating of said boss with said cavity forms a press fit and aligns said optical axis of said gas cell with said central optical axis of said optical assembly, said boss further comprising a thin flexible wall which is capable of flexing when said boss is inserted into said cavity, thereby minimizing the engagement force required to achieve said press fit.

4. A Raman gas analyzer as defined in claim 3 further comprising:

a ball and socket optical element mounting device; and a mirror mounted on said ball and socket optical element mounting device for adjusting the position of said mirror with respect to said optical axis of said resonant cavity.

5. An apparatus for aligning an optical axis of a laser in a Raman scattering gas analyzer with an end mirror, said apparatus comprising:

first and second support plates, said first and second plates including upper and lower surfaces;

threaded holes placed in at least one corner of said first and second support plates, said threaded holes having threads of unequal pitch and at least one locking thread;

a threaded fastener engageable with each of said threaded holes, said threaded fastener and said threaded holes forming a differential thread capable of fine adjustment, said locking thread of said threaded holes engaging said threaded fastener to fix the position of said threaded fastener with respect to said threaded holes after said threaded fastener has been engaged with said threaded holes;

a cavity formed on the upper surface of said second plate;

a supporting element including top and bottom ends and a boss formed on said bottom end, said boss having a shape corresponding to the shape of said cavity formed on the upper surface of said second plate, said boss including an outer wall having dimensions greater than those of said cavity, said outer wall suitable for mating with said cavity, said outer wall capable of flexing when said outer wall is inserted into said cavity, thereby minimizing the engagement force required to insert said boss into said cavity;

a housing formed on the top end of said supporting element; and a spherical socket mounted in said housing, said spherical socket containing said mirror, said spherical socket capable of being moved in said housing so that the angular position of said mirror with respect to said optical axis can be varied so that said mirror can be precisely fixed with respect to said optical axis.

6. The apparatus of claim 5, further comprising a Brewster prism mounted on said supporting element in front of said mirror, said prism polarizing light incident from said laser on said mirror into a desired polarization state and selecting a specific resonant wavelength.

7. A Raman gas analyzer as defined in claim 4 wherein said ball and socket optical element mounting device further comprises a ball portion and a socket portion with a cavity therebetween, said cavity having an opening for receiving adhesive material into said cavity.

8. An apparatus for aligning an optical axis of a laser in a Raman scattering gas analyzer having an end mirror, said apparatus comprising:

first and second support plates, said first and second plates including upper and lower surfaces;

threaded holes placed in at least one corner of said first and second support plates, said threaded holes having threads of unequal pitch and at least one locking thread;

a threaded fastener engageable with each of said threaded holes, said threaded fastener and said threaded holes forming a differential thread capable of fine adjustment, said locking thread of said threaded holes engaging said threaded fastener to fix the position of said threaded fastener with respect to said threaded holes after said threaded fastener has been engaged with said threaded holes; and a spherical ball/socket assembly attached to one of said first or second support plates, said spherical ball/socket assembly configured for mounting said end mirror thereto such that the angular position of said end mirror with respect to said optical axis can be varied so that said end mirror can be precisely fixed with respect to said optical axis.

* * * * *